United States Patent Office 3,772,291
Patented Nov. 13, 1973

3,772,291
2-ACYLIMINO-1,3-DIAZACYCLOALKENES AND -ALKADIENES
Robert Armistead Lucas, Mendham, and Herbert Morton Blatter, Summit, N.J., assignors to Ciba-Geigy Corporation, Ardsley, N.Y.
No Drawing. Continuation-in-part of application Ser. No. 26,433, Apr. 7, 1970, now Patent No. 3,719,679, which is a continuation-in-part of application Ser. No. 884,322, Dec. 11, 1969, now Patent No. 3,627,889, which in turn is a continuation-in-part of application Ser. No. 839,704, July 7, 1969, now Patent No. 3,655,895. This application Mar. 29, 1971, Ser. No. 129,185
Int. Cl. C07d 49/34, 51/28, 53/02
U.S. Cl. 260—256.5 R    3 Claims

ABSTRACT OF THE DISCLOSURE

Certain 2 - trimethoxybenzoylimino-1,3-diazacycloalkenes and -alkadienes, useful as intermediates, also exhibit central nervous system depressing effects.

CROSS-REFERENCES TO RELATED APPLICATIONS

This is a continuation-in-part of application Ser. No. 26,433, filed Apr. 7, 1970 now Pat. No. 3,719,678, which in turn is a continuation-in-part of application Ser. No. 884,322, filed Dec. 11, 1969, now Pat. No. 3,627,889, which in turn is a continuation-in-part of application Ser. No. 839,704, filed July 7, 1969 now Pat. No. 3,655,-895.

BACKGROUND OF THE INVENTION

According to Burkhardt et al., Chem. Ber. 100, 2569 (1967), 2-acetyl or benzoyl)-imino-1,3-diazacycloalkanes are obtained from N-dichloromethylene-acetamide or -benzamide and diaminoalkanes. This method obviously cannot be used in the preparation of corresponding trimethoxybenzoylimino derivatives, since the necessary N-dichloromethylene-trimethoxybenzamide cannot be prepared without chlorinating the benzene nucleus in one or both of the unsubstituted positions.

According to another method, various "2-imino-1,3-disubstituted hexahydropyrimidines and imidazolidines" are obtained according to U.S. Pat. No. 3,168,520, which compounds are useful in "the making of dyeings and of synthetic substances fast to gas-fading."

SUMMARY OF THE INVENTION

The present invention concerns and has for its objects the provision of new 5 to 7 ring-membered 1-$R_1$-2-trimethoxybenzoylimino-1,3-diazacycloalkanes (or of the tautomeric 1-$R_1$-2 - trimethoxybenzoylamino-1,3-diazacycloalkenes or of the isomeric 1-$R_1$-2-imino-3-trimethoxybenzoyl-1,3-diazacycloalkanes) or of N-alkyl or acyl derivatives or salts thereof, wherein $R_1$ is an unsubstituted or substituted aliphatic or cycloaliphatic radical, preferably of those corresponding to Formula I

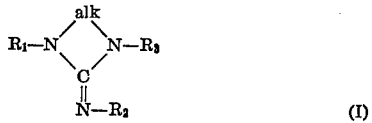

(I)

in which $R_1$ is lower alkyl, alkenyl or alkynyl (hydroxy, lower alkoxy or di-lower alkylamino)-lower alkyl wherein the oxygen or nitrogen atom is separated from the ring-nitrogen atom by at least 2 carbon atoms, 3 to 7 ring-membered cycloalkyl, cycloalkenyl, cycloalkyl-lower alkyl or cycloalkenyl-lower alkyl, $R_2$ is trimethoxybenzoyl, $R_3$ is hydrogen, lower alkyl, alkanoyl or a aralkanoyl and alk is lower alkylene separating the adjacent nitrogen atoms by 2 to 4 carbon atoms, or of salts thereof, as well as of corresponding pharmaceutical compositions and of methods for the preparation and application of these products. Said compositions are useful sedative-hypnotic agents.

DESCRIPTION OF THE PREFERRED EMBODIMENT

The substituent $R_1$ represents preferably lower alkyl, lower alkenyl, lower alkynyl or said (hydroxy, lower alkoxy or di-lower alkylamino)-lower alkyl radicals, e.g. methyl, ethyl, n- or i-propyl or -butyl, 3-methylbutyl, 1- or 2-pentyl, -hexyl or -heptyl allyl, methallyl, 2-butenyl, 2-but-2-enyl, 2- or 3-pentenyl, 2-pent-2-enyl or 2-hexenyl; propargyl, 2-butynyl or 2-hex-3-ynyl; 2-(hydroxy, methoxy, ethoxy, dimethylamino, diethylamino, di-n or i-propylamino)-ethyl or -propyl, 3-(hydroxy, methoxy or dimethylamino)-propyl or -butyl; but also 3 to 7 ring-membered cycloalkyl, cycloalkenyl, cycloalkyl-lower alkyl or cycloalkenyl-lower alkyl radicals, e.g. cyclopropyl, cyclopentyl or cyclohexyl; 1- or 2-cyclopentenyl, -cyclohexenyl or -cycloheptenyl; cyclopropylmethyl, cyclopentylmethyl, 2-cyclopentylethyl or cyclohexylmethyl; 1-cyclopentenylmethyl, 2-cyclopent-1-enylethyl or 1-cyclohexenylmethyl. The term "lower" referred to above and hereinafter in connection with organic radicals or compounds respectively, defines such with up to 7, preferably up to 4, carbon atoms.

The trimethoxybenzoyl radical $R_2$ contains the methoxy groups in any of the 5 positions of the phenyl nucleus thereof. It preferably represents 3,4,5-trimethoxybenzoyl, but also, for example, 2,3,4- or 2,4,5-trimethoxybenzoyl.

Acyl derivatives of the invention are derived from aliphatic or aromatic carboxylic acids, preferably of lower alkanoic or aralkanoic acids. Thus the radical $R_3$ represents, for example, acetyl, propionyl or pivalyl; benzoyl, mono-, di- or trimethoxybenzoyl or phenylacetyl.

The alkylene moiety "alk," separating the nitrogen atoms of the 1,3-diazacycloalkane moiety by 2–4 carbon atoms, preferably represents 1,2-ethylene or 1,3-propylene but also, for example, 1,2-propylene, 1,2-, 1,3-, 1,4- or 2,3-butylene, 1,2-, 1,3-, 1,4-, 2,3- or 2,4-pentylene, -hexylene or - heptylene.

The compounds of the invention exhibit valuable pharmacological properties. Besides central nervous system depressing effects, such as sedative and skeletal muscle relaxing effects, they predominantly exhibit hypnotic effects. This can be demonstrated in animal tests, using advantageously mammals, such as mice, rats, rabbits, cats, dogs or monkeys as test objects. The compounds of the invention can be applied to the animals enterally or parenterally, e.g. orally, intraperitoneally or intravenously, for example, in gelatin capsules or in the form of aqueous solutions or suspensions. The oral dosage may range in the lower animals, e.g. mice or rats, between about 1 and about 500 mg./kg./days, preferably between about 5 and about 200 mg./kg./day, and in the higher animals, e.g. dogs or monkeys, advantageously between about 10 and about 50 mg./kg./day. The effect on the spontaneous and induced motor activity is observed in the mice jiggle cage, light box or rotorod test systems, wherein a depression is recorded after oral medication. Oral doses in the cast induce a sleep-like state (constricted pupils and relaxed nictitating membranes) from which the animal can be aroused without showing motor incoordination. Oral doses produce also sleep in dogs and monkeys, wherein the animals assume a normal position. Low intravenous doses produce in the cat depression of several reflexes, e.g. the flexor and patellar reflex, and in the rabbit a lesser reduction of the respiratory rate as with conventional hypnotics at equi-hypnotic doses.

Accordingly, the compounds of the invention are useful sedative-hypnotic agents, for example, in the treatment or management of restlessness and emotional tension, for suppression of anxiety and neurotic manifestations, and preferably for the induction of sleep. They are also useful intermediates in the preparation of other valuable products, especially of pharmacologically active compounds.

Particularly useful are the compounds of Formula I, in which $R_1$ is alkyl with up to 4 carbon atoms, $R_2$ is 3,4,5-trimethoxybenzoyl, $R_3$ is hydrogen or alkyl with up to 4 carbon atoms and alk is 1,2-ethylene, 1,2- or 1,3-propylene, as well as those compounds of Formula I, in which $R_1$ is also alkenyl or alkynyl with up to 4 carbon atoms, $R_3$ is also alkanoyl with up to 4 carbon atoms and alk is also 1,2-, 1,3-, 1,4- or 2,3-butylene, as well as those compounds of Formula I, in which $R_1$ is also (hydroxy, alkoxy or dialkylamino)-alkyl wherein alkyl contains up to 4 carbon atoms and the oxygen or nitrogen atom therein is separated from the ring-nitrogen atom by at least 2 carbon atoms and $R_2$ is also 2,3,4- or 2,3,5-trimethoxybenzoyl, or therapeutically acceptable acid addition salts of all these compounds.

Especially valuable are compounds of Formula II

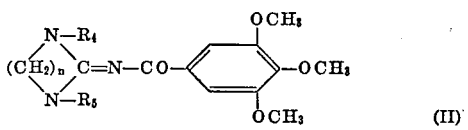

in which $R_4$ is methyl, ethyl, n-propyl, allyl or 2-dimethylaminoethyl, $R_5$ is hydrogen, methyl or acetyl and $n$ is an integer from 2 to 4, preferably 3, more particularly the 1-methyl-2-(3,4,5-trimethoxybenzoylimino)-hexahydropyrimidine, or therapeutically acceptable acid addition salts thereof, which exhibit a high order of sedative-hypnotic activity and low toxicity, preferably after oral application.

The compounds of this invention are prepared according to methods known per se. For example, the process for their preparation consists in:

(a) acylating a 1-$R_1$-2-imino-3-$R_3$-1,3-diazacycloalkane with a trimethoxybenzoic acid or a reactive functional derivative thereof or (b) converting in an N-Y-trimethoxybenzamide or -imide, in which Y is a substituent convertible into a 1-$R_1$-3-$R_3$-1,3-diazacyclo-2-(alkenyl or alkylidene) radical respectively, Y into said radical or (c) methylating a 1-$R_1$-3-$R_3$-2-trihydroxybenzoylimino-1,3-diazacycloalkane or (d) hydrogenating a 1-$R_1$-2-$R_2$-imino-3-$R_3$-1,3-diazacycloalkene or -alkadiene and, if desired, converting any resulting 5 to 7 ring-membered compound into another compound of the invention.

The acylation according to item (a) is advantageously performed with a reactive functional derivative of the trimethoxybenzoic acid, such as a lower alkyl ester, halide, e.g. chloride or bromide, or anhydride thereof, e.g. the simple or a mixed anhydride with any other suitable acid, such as a lower alkyl carbonic acid.

In the starting material mentioned under item (b), the substituent Y is, for example, a 1-unsubstituted 3-$R_3$-1,3-diazacyclo-2-(alkenyl or alkylidene) radical, which can be substituted in the 1-position, for example, by reaction with a reactive ester of the alcohol $R_1$-OH, for example, that of a strong mineral or sulfonic acid, such as a hydrohalic acid, e.g. hydrochloric, hydrobromic or hydriodic acid, sulfuric acid or a lower alkane or benzene sulfonic acid, e.g. methane-, ethane- or p-toluenesulfonic acid. Another substituent Y is, for example, a cyano or dialkyl, mercaptomethylene group, e.g. dimethylmercaptomethylene, or a thiocarbamoyl or S-alkyl-isothiocarbamoyl group or the N'-$R_1$ or N'-$R_2$ derivatives thereof. The corresponding starting material, i.e. an N-$R_2$-cyanamide, a dialkyl N-$R_2$-dithiocarbaminate, N-$R_2$-thiourea, N,N'-bis-$R_2$-thiourea or advantageously an S-alkyl-N-$R_2$-isothiourea or S-alkyl-N,N'-bis-$R_2$-isothiourea respectively, is condensed with the diamine $R_1$-NH-alk-NH-$R_6$, wherein $R_6$ is hydrogen or lower alkyl, in order to obtain the compounds of the invention.

The methylation according to item (c) is advantageously performed with diazomethane, but also with a reactive ester of methanol, e.g. such mentioned above for $R_1$-OH.

The hydrogenation according to item (d) is preferably carried out with catalytically activated or nascent hydrogen, for example hydrogen applied in the presence of nickel, platinum or palladium catalysts or generated electrolytically or by the action of metals on acids or alcohols, such as heavy metals, e.g. zinc or iron, on mineral or carboxylic acids, or light metals, e.g. sodium or magnesium, on alkanols.

The compounds of the invention so obtained, can be converted into each other according to methods known per se. For example, resulting compounds of Formula I in which $R_3$ is hydrogen, can be acylated or alkylated in 3-position as shown under items (a) and (b), i.e. with reactive functional derivatives of aliphatic or aromatic acids or reactive esters of lower alkanols respectively. Resulting compounds in which $R_3$ is an acyl group, e.g. trimethoxybenzoyl or lower alkanoyl, can be hydrolyzed, e.g. by the careful application of acidic or alkanline hydrolyzing agents, such as aqueous mineral acids or alkalis, e.g. hydrohalic or sulfuric acids, or alkali metal, e.g. sodium or potassium, hydroxides, carbonates or bicarbonates.

The compounds of the invention are obtained in the free form or in the form of their salts, depending on the conditions under which the above process is carried out. A resulting free base can be converted into a corresponding acid addition salt, for example by reacting it with an inorganic or organic acid, preferably a therapeutically useful acid, or with a corresponding anion exchange preparation, and isolating the desired salt. An acid addition salt may be converted into the free compound by treatment with a base, e.g. a metal hydroxide, ammonia or a hydroxyl ion exchange preparation. Therapeutically useful acids are, for example, inorganic acids, such as strong metalloidic acids, for example, hydrohalic, e.g. hydrochloric, hydrobromic, sulfuric, phosphoric, nitric or perchloric acid, or organic acids, such as carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic, sulfanilic and cyclohexylsulfamic acid; methionine, tryptophan, lysine and arginine.

These or other salts, for example, the picrates, can also be used for purification of the resulting free compounds, which are converted into salts, the salts separated and the free compounds liberated from the salts. In view of the close relationship between the free compounds and the compounds in the form of their salts, whenever a compound is referred to in this context, a corresponding salt is also intended, provided such is possible or appropriate under the circumstances.

Resulting mixtures of isomers can be separated into the single isomers by methods in themselves known, e.g. by fractional distillation, crystallization and/or chromatography. Racemic products can likewise be resolved into the optical antipodes, for example, by separation of diastereomeric salts thereof, e.g. by the fractional crystallization of d- or l-tartrates.

The above reactions are carried out according to standard methods, in the presence or absence of diluents, preferably such as are inert to the reagents and are solvents thereof, of catalysts, condensing, neutralizing agents and/or inert atmospheres, at low temperatures, room temperature or elevated temperatures, at atmospheric or superatmospheric pressure. For example, in the above acylation or alkylation reactions, the generated mineral or sulfonic acid may be neutralized with inorganic or organic bases, such as alkali or alkaline earth metal carbonates or bicarbonates, tri-lower alkylamines or pyridine.

The invention also comprises any modification of the above process, wherein a compound resulting as an intermediate at any stage thereof, is used as starting material and the remaining steps are carried out or the process is discontinued at any stage thereof, or in which the starting material is formed under the reaction conditions or is used in the form of its salts or reactive derivatives. For example, in the reaction according to item (b) with compounds in which Y is dialkylmercaptomethylene, the intermediate formed first is an S-alkyl-N-$R_2$-isothiourea, which ring-closes in a second step under the influence of heat and/or acidic catalysts. Also in the methylation reaction according to item (c), dihydroxy- methoxy- and dimethoxy-hydroxybenzoylimino intermediates are formed during the etherification procedure which, of course, can also be chosen as starting materials. The hydrogenation according to item (d) may also be carried out stepwise, for example, a 1-$R_1$-2-$R_2$-imino-1,3-diazacycloalkadiene can first be reduced with sodium borohydride to the corresponding 1 - $R_1$ - 2 - $R_2$-imino-3H-1,3-diazacycloalkene, which latter or its 3-$R_3$-derivative, is subjected to hydrogenation. Preferred are starting materials, which lead to those compounds of the invention, which are indicated above as the preferred embodiments of the invention.

The starting materials used are known or, if new, may be prepared according to the methods illustrated in the examples herein. For example, the starting material mentioned under item (a) is prepared in accordance with the methods described in U.S. Pat. No. 3,027,370 or British Pat. No. 765,547. The starting material mentioned under item (b) in which Y is a 1-unsubstituted 3-$R_3$-1,3-diazacyclo-2-(alkenyl or alkylidene) radical, can be obtained either by the acylation method according to item (a) or from corresponding 1 - benzyl - 2-$R_2$-3-$R_3$-1,3-diazacycloalkanes, which are subjected to reductive cleavage, e.g. with the use of catalytically activated hydrogen. The starting material, in which Y is advantageously bis-(lower alkylmercapto)-methylene, can be obtained by addition of lower alkylmercaptanes to trimethoxybenzoylisothiocyanates and reacting the resulting dithiourethanes with a lower alkyl halide or sulfonate. The thioureas or isothioureas also mentioned under item (b) as well as the starting material mentioned under items (c) and (d) can be prepared analogous to the acylation process described under item (a), i.e. by reacting the corresponding benzoic acid derivatives, advantageously their lower alkyl esters or halides, with the respective nitrogen bases. The starting material mentioned under item (c) and (d) as well as the process intermediates thereof, e.g. the 1-$R_1$-3-$R_3$-2-(methoxy-dihydroxy- or hydroxy-dimethoxybenzolylimino) - 1,3 - diazacycloalkanes, are new and are considered as additional subject matter of the present invention. They also exhibit central nervous system depressing effects similar to those observed with the compounds of Formula I or II. Preferred are the compounds mentioned under item (d) which yield the products of Formula II, i.e. those corresponding to Formulae III and IV

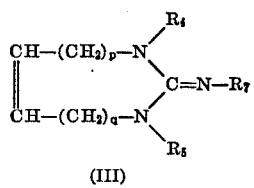

(III)

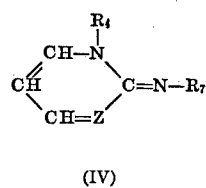

(IV)

wherein each of $p$ and $q$ is an integer from 0 to 2 and $p+q$ is not greater than 2, Z is either nitrogen or the moiety

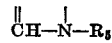

and $R_7$ is 3,4,5-trimethoxybenzoyl, or acid addition salts thereof.

The pharmacologically active compounds of the invention are useful in the manufacture of pharmaceutical compositions containing an effective amount thereof in conjunction or admixture with excipients suitable for either enteral or parenteral application. Preferred are tablets and gelatin capsules comprising the active ingredient together with (a) diluents, e.g. lactose, dextrose, sucrose, mannitol, sorbitol, cellulose and/or glycine, (b) lubricants, e.g. silica, talcum, stearic acid, its magnesium or calcium salt and/or polyethyleneglycol, for tablets also (c) binders, e.g. magnesium aluminum silicate, starch paste, gelatin, tragacanth, methylcellulose, sodium carboxymethylcellulose and/or polyvinylpyrrolidone, if desired, (d) disintegrants, e.g. starches, agar, alginic acid or its sodium salt, enzymes of the binders or effervescent mixtures and/or (e) adsorbents, colorants, flavors and sweeteners. Injectable compositions are preferably aqueous isotonic solutions or suspensions, and suppositories are advantageously fatty emulsions or suspensions. They may be sterilized and/or contain adjuvants, such as preserving, stabilizing, wetting or emulsifying agents, solution promoters, salts for regulating the osmotic pressure and/or buffers. They may also contain other therapeutically valuable substances. Said pharmaceutical compositions are prepared according to conventional mixing, granulating or coating methods respectively and contain about 0.1 to 75%, preferably about 1 to 50% of the active ingredient.

The following examples are intended to illustrate the invention and are not to be construed as being limitations thereon. Temperatures are given in degrees centigrade, and all parts wherever given are parts by weight.

Example 1

To the solution obtained from 5.76 g. sodium and 100 ml. anhydrous methanol, 48.58 g. 1-methyl-2-imino-hexahydropyrimidine hydrobromide are added while stirring and cooling. After ½ hour, the mixture is evaporated in vacuo on the water bath for 4 hours. Hereupon 125 ml. tetrahydrofuran are added under nitrogen followed by the solution of 28.8 g. 3,4,5-trimethoxybenzoyl chloride in 185 ml. tetrahydrofuran during 35 minutes at 5–10° while stirring. After stirring overnight at room temperature, the mixture is poured onto 770 ml. ice and water and 21.2 g. sodium bicarbonate are added while stirring. The mixture is exrtacted three times with 100 ml. methylene chloride, the extract dried, filtered and evaporated below 40°. The residue is triturated with 45 ml. diethyl ether for 1 hour at room temperature, the mixture filtered and the residue washed with cold diethyl ether, to yield the 1-methyl-2-(3,4,5-trimethoxybenzoylimino)-hexahydropyrimidine of the formula

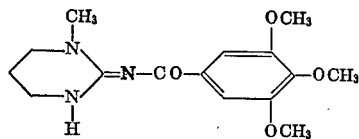

melting at 142–145°.

The starting material is prepared as follows: To the mixture of 97.6 g. 3-methylamino-propylamine and 270 ml. methanol, the solution of 118 g. cyanogen bromide in 270 ml. methanol is added dropwise during 2 hours at 5–15° while stirring. After stirring at room temperature overnight, the mixture is refluxed for 6 hours and evaporated in vacuo. The residue is recrystallized from 217 ml. hot isopropanol and dried for 5 hours in vacuo, to yield the 1-methyl-2-imino-hexahydropyrimidine hydrobromide melting at 142–144°.

Example 2

To the solution obtained from 2.3 g. sodium and 40 ml. methanol, 19.4 g. 1-methyl-2-imino-hexahydropyrimidine hydrobromide are added portionwise while stirring. After the initial lumps formed are dissolved, the mixture is evaporated in vacuo at room temperature for about 3 hours. The dry residue is slurried in 40 ml. tetrahydrofuran and 30 ml. triethylamine, whereupon the solution of 23 g. 3,4,5-trimethoxybenzoyl chloride in 50 ml. tetrahydrofuran is added during 15 minutes at 5–15° while stirring. The mixture is stirred at room temperature overnight and evaporated in vacuo. The residue is shaken with 60 ml. methylene chloride and 60 ml. aqueous ammonia, and the aqueous phase washed with methylene chloride. The combined organic solution is washed with 30 ml. water, dried, filtered and evaporated in vacuo. The residue is taken up in 60 ml. benzene and the solution extracted with 30 ml. water and 30 ml. 10% hydrochloric acid. The combined aqueous layer is made basic with ammonia, the precipitate formed filtered off, washed with water, dried and recrystallized from tetrahydrofuran, to yield the 1-methyl-2-(3,4,5-trimethoxybenzoylimino) - 3 - (3,4,5,-trimethoxybenzoyl)-hexahydropyrimidine of the formula

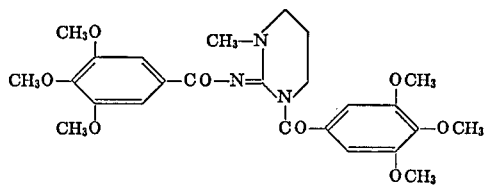

melting at 206–208°.

Example 3

Preparation of 1000 tablets each containing 250 mg. of the active ingredient:

| Formula: | G. |
| --- | --- |
| 1-methyl - 2 - (3,4,5-trimethoxybenzoylimino)-hexahydropyrimidine | 250.0 |
| Wheat starch | 346.8 |
| Magnesium aluminum silicate | 20.0 |
| Methylcellulose | 13.3 |
| Stearic acid | 13.3 |
| Colloidal silica | 6.6 |
| Anhydrous ethanol, q.s. | |
| Purified water, q.s. | |

Procedure: All powders with the exception of the silica and 96.8 g. of the starch are passed through a screen having openings of 0.6 mm. and mixed well. From the remaining starch and 65 ml. water a paste is formed which is used to granulate the powders together with the ethanol. The wet granulate is passed through a screen with 2 mm. openings and dried overnight at 35°. The dry granulate is broken in a hammer mill, passed through a screen with 1.2 mm. openings and compressed into tablets each weighing 0.65 g., using concave punches with 12 mm. diameter, uppers quartered.

Example 4

To the solution of 1 g. 1-methyl-2-(3,4,5-trimethoxybenzoylimino)-hexahydropyrimidine in 5 ml. pyridine, 1 ml. acetic anhydride is added and the mixture allowed to stand at room temperature for 2 days. It is evaporated in vacuo, the residue dissolved in 2 ml. hot tetrahydrofuran and the precipitate formed after cooling filtered off, to yield the 1-methyl-3-acetyl-2-(3,4,5-trimethoxybenzoylimino)-hexahydropyrimidine of the formula

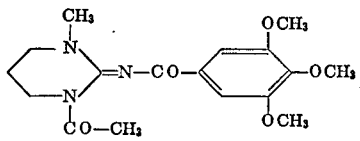

melting at 135–137°.

Example 5

To the solution of 5 g. 2 - (3,4,5 - trimethoxybenzoylimino)-hexahydropyrimidine in 50 ml. dimethylformamide, 0.7 g. of 57% sodium hydride in mineral oil are added and the mixture stirred for 1 hour at room temperature. After cooling to 5°, the mixture of 1.5 ml. ethyl iodide and 12 ml. dimethylformamide is added dropwise during 7 minutes and the mixture stirred 3 hours at room temperature. It is diluted with 180 ml. ice water, extracted with methylene chloride, the extract dried, filtered and evaporated. The residue is triturated with 15 ml. cyclohexane, filtered off and washed with cyclohexane, to yield the 1-ethyl-2-(3,4,5 - trimethoxy - benzoylimino) - hexahydropyrimidine of the formula

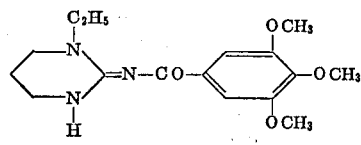

melting at 123–125°.

In the analogous manner, the 1-n-propyl-2-(3,4,5-trimethoxybenzoylimino)-hexahydropyrimidine is prepared, melting at 106–107°.

The starting material is prepared as follows: To the solution obtained from 2,3 g. sodium and 50 ml. methanol, 18 g. 2 - imino - hexahydropyrimidine hydrobromide are added while stirring and cooling. After ½ hour, 22.6 g. methyl 3,4,5-trimethoxybenzoate are added, the mixture stirred ½ hour at room temperature and gradually heated to the internal temperature of about 140–150° while distilling off methanol. Said temperature is maintained for ½ hour and the mixture further evaporated in the vacuum of a water-jet pump. The residue is taken up in 20 ml. water, the mixture extracted with 60 ml. methylene chloride, the extract dried, filtered and evaporated. The residue is taken up in 30 ml. hot benzene, the solution cooled, the crystals formed filtered off, dissolved in 80 ml. methanol, the solution concentrated to half the volume, the precipitate formed filtered off and washed with methanol, to yield the 2-(3,4,5-trimethoxybenzoylimino)-hexahydropyrimidine melting at 181–183°. From the combined mother liquors another crop thereof can be obtained.

By replacing the 18 g. 2-imino-hexahydropyrimidine hydrobromide by 19.4 g. of its 1-methyl derivative, and following the procedure given, the compound of Example 1 is obtained.

Example 6

To the solution of 5 g. 2-(3,4,5-trimethoxybenzoylimino)-hexahydropyrimidine in 50 ml. dimethylformamide, 0.7 g. of 57% sodium hydride in mineral oil are added and the mixture stirred for 1 hour at room temperature. After cooling to 5°, the mixture of 1.5 ml. allyl chloride and 11.5 ml. dimethylformamide is added dropwise during 7 minutes and the mixture stirred 3 hours at room temperature. It is diluted ith 180 ml. ice water, extracted with methylene chloride, the extract dried, filtered and evaporated. The residue is triturated with 15 ml. pentane, taken up in the minimum amount of benzene and the solution chromatographed on 75 g. aluminum oxide. 200 ml. of the first benzene eluate are collected, evaporated and the residue recrystallized from methanol, to yield the 1-allyl - 2 - (3,4,5 - trimethoxybenzoylimino) - hexahydropyrimidine of the formula

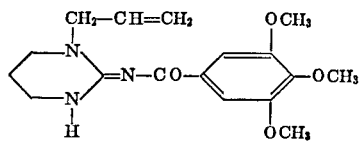

melting at 144–146°.

Example 7

To the solution of 1 g. 2 - (3,4,5 - trimethoxybenzoylimino)-imidazolidine in 10 ml. dimethylformamide, 0.15 g. 56.8% sodium hydride in mineral oil are added and the mixture stirred for 1 hour. Hereupon 0.25 ml. methyl iodide in 2.5 ml. dimethylformamide are added dropwise at about 5° while stirring. The mixture is stirred for 3 hours at room temperature and diluted with 36 ml. ice water. The precipitate formed is filtered off, washed with water, dried and recrystallized from methanol, to yield the 1-methyl-2-(3,4,5-trimethoxybenzoylimino) - imidazolidine of the formula

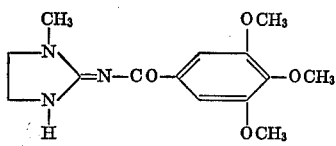

melting at 201–203°.

The starting material is prepared as follows: To the mixture of 60.1 g. ethylene diamine and 100 ml. methanol, the solution of 106 g. cyanogen bromide in 100 ml. methanol is added dropwise during 90 minutes while stirring and keeping the temperature below 10°. The mixture is stirred at room temperature overnight, refluxed for 6 hours and evaporated in vacuo. The residue is recrystallized several times from isopropanol, to yield the 2-imino-imidazolidine hydrobromide melting at 125–129°.

16.6 g. thereof are added to the solution obtained from 2.3 g. sodium and 40 ml. methanol, and the mixture is stirred for ½ hour at room temperature. Hereupon 22.6 g. methyl 3,4,5-trimethoxy-benzoate are added and the mixture stirred for ½ hour at room temperature. It is slowly concentrated, the concentrate stirred at 140–150° for ½ hour and finally evaporated at 12 mm. Hg. The residue is taken up in 60 ml. water, the mixture extracted with methylene chloride, the extract filtered and evaporated. The residue is triturated with 40 ml. diethyl ether and recrystallized from methanol, to yield the 2-(3,4,5-trimethoxybenzoylimino) - imidazolidine melting at 149–150°.

Example 8

To the solution of 1 g. 1-methyl-2-(3,4,5-trimethoxybenzoylimino)-hexahydropyrimidine in 20 ml. dimethylformamide, 0.137 g. 56.8% sodium hydride in mineral oil are added and the mixture stirred at room temperature for 1 hour. It is cooled to about 5°, 0.21 ml. methyl iodide in 2 ml. dimethylformamide are added dropwise at said temperature and the mixture is stirred for 3 hours at room temperature. It is diluted with 60 ml. water and 10 ml. saturated aqueous sodium chloride, extracted with methylene chloride, the extract dried, filtered and evaporated. The residue is recrystallized from tetrahydrofuran, to yield the 1,3-dimethyl - 2 - (3,4,5 - trimethoxybenzoylimino)-hexahydropyrimidine of the formula

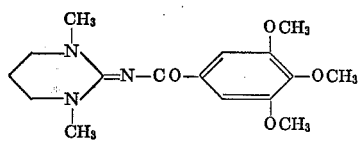

melting at 184–186°.

Example 9

To the solution of 0.586 g. 2-(3,4,5-trimethoxybenzoylimino)-hexahydropyrimidine in 5.8 ml. dimethylformamide, 0.288 g. 2-dimethylaminoethyl chloride hydrochloride and 0.256 g. potassium hydroxide are added and the mixture stirred at room temperature for 22 hours. It is diluted with 24 ml. ice water, extracted with methylene chloride, the extract dried and evaporated. The residue is taken up in diethyl ether, the solution filtered and the filtrate concentrated, to yield the 1-(2-dimethylaminoethyl)-2 - (3,4,5 - trimethoxybenzoylimino) - hexahydropyrimidine of the formula

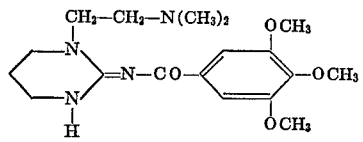

melting at 88–90°.

Example 10

To 2.79 ml. dimethylformamide, 0.279 g. 2-(3,4,5-trimethoxybenzoylimino)-imidazolidine, 0.144 g. 2-dimethylaminoethyl chloride hydrochloride and 0.128 g. potassium hydroxide are added in this order while stirring and stirring is continued for 21 hours at room temperature. Hereupon the solution is diluted with 12 ml. ice water, extracted with methylene chloride, the extract dried and evaporated. The residue is taken up in 5 ml. warm water and the precipitate formed after cooling is filtered off and dried at room temperature, to yield the 1-(2-dimethylaminoethyl) - 2 - (3,4,5-trimethoxybenzoylimino)-imidazolidine of the formula

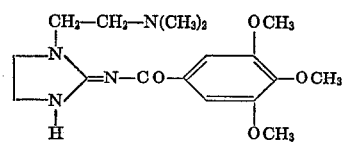

melting at 129–131°.

Example 11

To the solution of 2.65 g. 1-methyl-2-galloylimino-hexahydropyrimidine in 30 ml. methanol, 33 ml. N-ethereal diazomethane are added dropwise while stirring and the mixture is allowed to stand overnight at room temperature. Hereupon a few drops acetic acid are added, the mixture evaporated in vacuo and the residue taken up in 5% aqueous sodium carbonate. The mixture is extracted with methylene chloride, the extract dried, filtered, evaporated and the residue is triturated with diethyl ether, to yield the 1 - methyl-2-(3,4,5-trimethoxybenzoylimino)-hexahydropyrimidine, melting at 142–145°; it is identical with the compound obtained according to Example 1.

The starting material is prepared as follows: The mixture of 9.2 g. methyl gallate, 20 ml. methanol and 5.7 g. 1-methyl-2-imino-hexahydropyrimidine is slowly concentrated to reach a temperature between 140–150°. After ½ hour the mixture is evaporated in vacuo, to yield the 1-methyl - 2-galloylimino-hexahydropyrimidine, which in used as such without further purification.

Example 12

0.3 g. 1-methyl-2-(3,4,5-trimethoxybenzoylimino)-1,2,3,4-tetrahydropyrimidine is hydrogenated in 10 ml. ethanol over 0.03 g. platinum catalyst at room temperature and atmospheric pressure. After the consumption of the theoretical amount of hydrogen, the mixture is filtered, the filtrate evaporated and the residue recrystallized from isopropanol, to yield the 1 - methyl-2-(3,4,5-trimethoxybenzoylimino) - hexahydropyrimidine, melting at 143–145°; it is identical with the compound obtained according to Example 1.

The starting material is prepared as follows: To the solution of 4.74 g. 1-methyl-2-imino-1,2-dihyropyrimidine hydroiodide in 47.4 ml. dimethylformamide, 0.845 g. 57% sodium hydride in mineral oil are added at 15° while stirring. After 1 hour the mixture is cooled to 5° and the solution of 2.3 g. 3,4,5-trimethoxybenzoyl chloride in 6.9 ml. tetrahydrofuran is added dropwise. After 3 hours stirring at room temperature, 160 ml. ice water and 0.7 g. potassium carbonate are added, the mixture extracted with methylene chloride, the extract dried, filtered and evaporated. The residue is triturated with 10 ml. diethyl ether, filtered off and washed with diethyl ether. The residue is taken up in methylene chloride, the solution extracted with 10 ml. 15% hydrochloric acid, the aqueous layer made basic with ammonia and extracted with methylene chloride. The extract is dried, evaporated and the residue recrystallized from tetrahydrofuran, to yield the 1-methyl-2 - (3,4,5-trimethoxybenzolyimino)-1,2-dihydropyrimidine of the formula

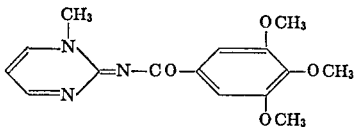

melting at 183–184°.

To the solution of 0.4 g. thereof in 8 ml. methanol, 0.4 g. sodium borohydride are added portionwise while stirring and the mixture is allowed to stand at room temperature for 1 hour. It is diluted with 16 ml. ice water, the precipitate formed filtered off, washed with water and recrystallized from methanol, to yield the 1-methyl-2-(3,4,5-trimethoxybenzoylimino)-1,2,3,4-tetrahydropyrimidine of the formula

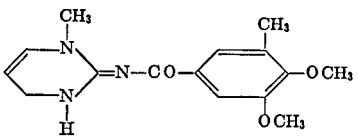

melting at 139–141°.

Example 13

Preparation of 10,000 capsules, each containing 250 mg. of the active ingredient:

| Formula: | G. |
|---|---|
| 1 - allyl - 2 - (3,4,5-trimethoxybenzoylimino)-hexahydropyrimidine | 2,500 |
| Lactose | 1,500 |
| Talcum powder | 300 |

Procedure: All the powders are passed through a screen with an opening of 0.6 mm. Then the drug substance is placed in a suitable mixer and mixed first with the talcum, then with the lactose until homogenous. No. 1 capsules are filled with 430 mg., using a capsule filling machine.

According to the above procedure or that of Example 3, capsules or tablets can be prepared containing any of the other active ingredients illustrated by the remaining examples.

Example 14

To the solution obtained from 1.15 g. sodium and 20 ml. methanol, 9.7 g. 1-methyl-2-imino-hexahydropyrimidine hydrobromide are added while cooling and stirring. After ½ hour, 11.3 g. methyl 2,4,5-trimethoxybenzoate are added and the whole stirred for ½ hour at room temperature. Hereupon the mixture is concentrated until the temperature reaches 140° and the mixture stirred for ½ hour at this temperature. It is evaporated in vacuo, the residue taken up in 20 ml. water, the solution extracted with methylene chloride, the extract dried, filtered and evaporated. The residue is taken up in 55 ml. hot benzene, the solution filtered and the precipitate formed after cooling filtered off and washed with cold benzene. It is triturated with 11.3 ml. cold methanol, filtered and the precipitate washed with cold methanol, to yield the 1-methyl - 2 - (2,4,5-trimethoxybenzoylimino)-hexahydropyrimidine of the formula

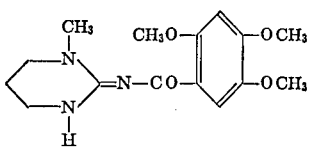

melting at 162–164°.

Example 15

To the solution of 4 g. 2 - (3,4,5-trimethoxybenzoylimino)-hexahydropyrimidine in 40 ml. dimethylformamide, 0.63 g. 56.8% sodium hydride in mineral oil are added while stirring at 15°. After stirring for ½ hour at room temperature, 1.4 ml. cyclopropylmethyl bromide are added dropwise while stirring at 5°, and stirring is continued for 18 hours at room temperature. The mixture is diluted with 120 ml. ice water, the precipitate formed filtered off and washed with water. It is dissolved in methylene chloride, the solution dried, filtered and evaporated. The residue is taken up in 4 ml. hot isopropanol and the precipitate formed after cooling filtered off and washed with cold isopropanol and pentane, to yield the 1-cyclopropylmethyl - 2-(3,4,5-trimethoxybenzoylimino)-hexahydropyrimidine of the formula

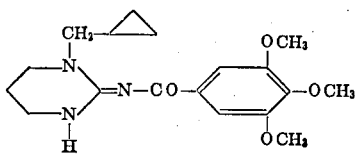

melting at 120–121°.

By replacing the cyclopropylmethyl bromide by 1.84 ml. n-pentyl bromide and by following the procedure shown above, the 1-n-pentyl-2-(3,4,5-trimethoxybenzoylimino)-hexahydropyrimidine is obtained, melting at 110–112°.

Example 16

To the solution of 2.93 g. 1-methyl-2-syringoyliminohexahydropyrimidine in 50 ml. methanol, 12 ml. N-ethereal diazomethane are added dropwise while stirring and the mixture allowed to stand overnight at room temperature. Hereupon one drop acetic acid is added, the mixture evaporated in vacuo and the residue taken up in 5% aqueous sodium carbonate. It is extracted with methylene chloride, the extract dried, evaporated and the residue recrystallized from isopropanol, to yield the 1-methyl-2-(3,4,5-trimethoxybenzoylimino) - hexahydropyrimidine, melting at 142–145°; it is identical with that obtained according to Examples 1, 11 and 12.

The starting material is prepared as follows: To the mixture of 15.1 g. methyl 4-benzyloxy-3,5-dimethoxybenzoate and 75 ml. toluene, 5.6 g. 1-methyl-2-imino-hexahydropyrimidine are added, the mixture refluxed for 1 day under nitrogen and evaporated in vacuo. The residue is taken up in 143 ml. methanol, the solution concentrated and the precipitate formed filtered off, to yield the 1-methyl-2-(4-benzyloxy - 3,5 - dimethoxybenzoylimino)-hexahydropyrimidine melting at 147–149°. The solution of 19.1 g. thereof in 100 ml. toluene and 50 ml. methanol is hydrogenated over 1.91 g. 10% palladium on charcoal until 1.12 liter hydrogen have been absorbed. The mixture is combined with 150 ml. methylene chloride-methanol (2:1), filtered, the filtrate evaporated in vacuo and the residue recrystallized from methylene chloride-isopropanol, to yield the 1-methyl-2-syringoyliminohexahydropyrimidine, melting at 229–231°.

Example 17

To the solution of 2 g. of 2-(3,4,5-trimethoxybenzoylimino)-imidazolidine in 20 ml. of dimethylformamide, 0.3 g. of 57% sodium hydride in mineral oil are added while stirring at room temperature. After 1 hour, 0.63 ml. of ethyl iodide in 5 ml. dimethylformamide are added dropwise at about 5° and the mixture stirred overnight at room temperature. It is poured into 100 ml. ice water, the precipitate formed filtered off, washed with water and recrystallized from methanol, to yield the 1-ethyl-2-

(3,4,5-trimethoxybenzoylimino)-imidazolidine of the formula

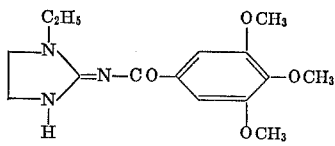

melting at 152–153°.

Example 18

Preparation of 1,000 capsules, each containing 50 mg. of the active ingredient:

| Formula: | G. |
|---|---|
| 1 - methyl-2-(3,4,5-trimethoxybenzoylimino)-hexahydropyrimidine | 50.0 |
| Lactose | 200.0 |
| Talcum powder | 30.0 |
| Sodium lauryl sulfate | 8.0 |
| Magnesium stearate | 12.0 |

Procedure: All the powders are passed through a screen with 0.6 mm. openings and mixed in a suitable mixer until homogenous. No. 1 capsules are filled with 400 mg., using a capsule filling machine.

We claim:

1. A compound of the formula

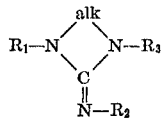

in which $R_1$ is alkyl, alkenyl or alkynyl, each with up to 4 carbon atoms, (hydroxy, alkoxy or dialkylamino)-alkyl wherein alkyl contains up to 4 carbon atoms and the oxygen or nitrogen atom is separated from the ring-nitrogen atom by at least 2 carbon atoms, 3 to 7 ring-membered unsubstituted cycloalkyl, cycloalkenyl (cycloalkyl or cycloalkenyl) C–1 to 4 alkyl, $R_2$ is trimethoxybenzoyl, $R_3$ is hydrogen, alkyl or alkanoyl each with up to 4 carbon atoms and alk is alkenylene or alkadienylene containing and separating the adjacent nitrogen atoms by 2 to 4 carbon atoms, or a therapeutically useful acid addition salt thereof.

2. A compound as claimed in claim 1 and corresponding to the formulae

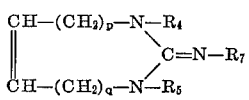 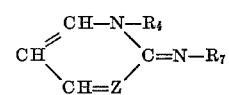

wherein $R_4$ is methyl, ethyl, n-propyl, allyl or 2-dimethylaminoethyl, $R_5$ is hydrogen, methyl or acetyl, each of $p$ and $q$ is an integer from 0 to 2 and $p+q$ is not greater than 2, Z is either nitrogen or the moiety CH—N—$R_5$ and $R_7$ is 3,4,5-trimethoxybenzoyl, or a therapeutically useful acid addition salt thereof.

3. A compound as claimed in claim 1 and being the 1-methyl - 2 - (3,4,5-trimethoxybenzoylimino)-1,2,3,4-tetrahydropyrimidine or a therapeutically useful acid addition salt thereof.

References Cited

UNITED STATES PATENTS

| 2,713,582 | 7/1955 | Smith | 260—256.411 |
| 3,634,508 | 1/1972 | Bream et al. | 260—256.411 |

RICHARD J. GALLAGHER, Primary Examiner

U.S. Cl. X.R.

260—239 BC, 256.4 H, 309.6